Jan. 10, 1967 J. L. E. BALDWIN ETAL 3,297,884
ADVANCE PULSE GENERATOR EMPLOYING ADDITIONAL TRANSISTOR TO SENSE AND REMOVE EXCESS CHARGE ON COUPLING CAPACITOR DUE TO INPUT PULSE SKIPPING
Filed Feb. 21, 1964 2 Sheets-Sheet 1

INVENTORS
JOHN LEWIS EDWIN BALDWIN
DEREK JOHN PARKYN
BY Hane and Nydick
ATTORNEYS FIG. 4A
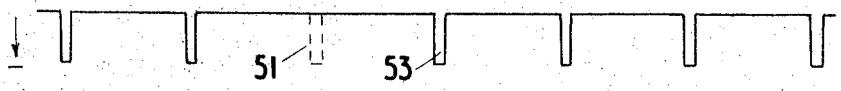
FIG. 4B
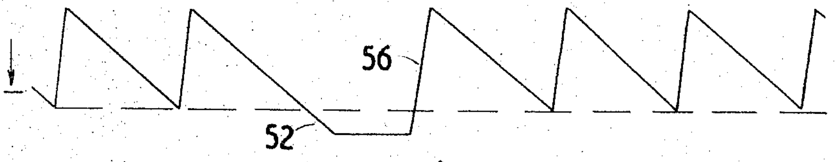
FIG. 4C
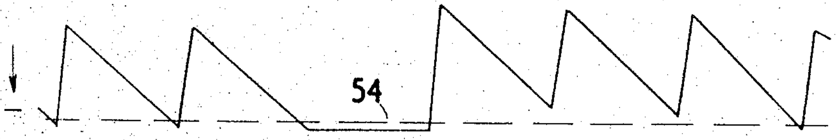
FIG. 4D
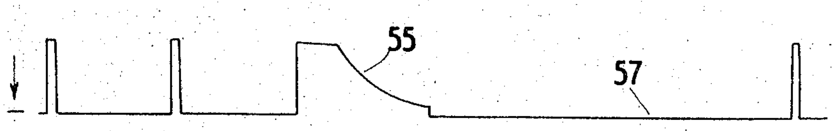
FIG. 4E
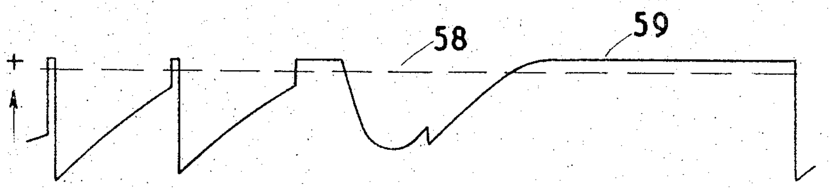
FIG. 4F
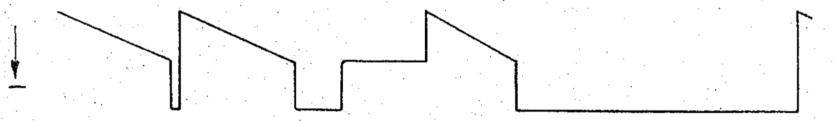
FIG. 4.
INVENTORS
JOHN LEWIS EDWIN BALDWIN
DEREK JOHN PARKYN
BY Kane and Nydick
ATTORNEYS United States Patent Office 3,297,884

Patented Jan. 10, 1967

3,297,884

ADVANCE PULSE GENERATOR EMPLOYING ADDITIONAL TRANSISTOR TO SENSE AND REMOVE EXCESS CHARGE ON COUPLING CAPACITOR DUE TO INPUT PULSE SKIPPING

John Lewis Edwin Baldwin, Croydon, and Derek John Parkyn, Sanderstead, England, assignors to Rank-Bush Murphy Limited, London, England, a British company Filed Feb. 21, 1964, Ser. No. 346,456
Claims priority, application Great Britain, Feb. 28, 1963, 8,038/63
6 Claims. (Cl. 307—88.5)

Figures 1, 2, 3:
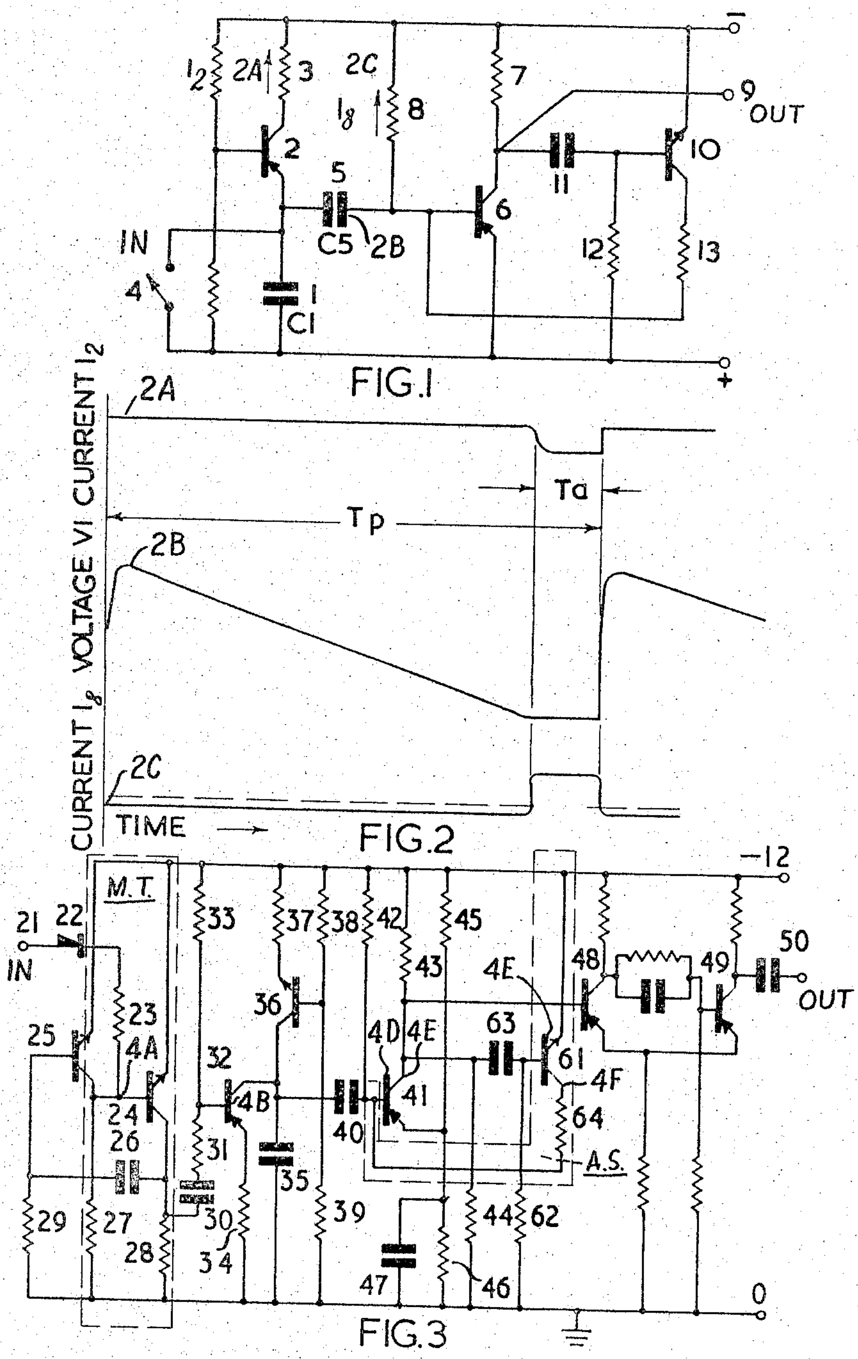

In many different types of telecommunications apparatus it is required to ensure that some function is initiated shortly before the occurrence of each impulse in a repetitive train of impulses. The initiation of such functions is conveniently effected by providing a circuit arrangement which responds to one impulse of the repetitive train by producing an advance impulse so delayed as to precede the succeeding impulse of the train by an appropriately short time interval. It is usually not suitable for the "advance" pulse so generated to occur at a constant time-interval after the initiating impulse, for in many telecommunications applications it must be possible for the repetition rate of the train of repetitive impulses to vary appreciably without disturbing the operation of the equipment. Numerous complex circuit arrangements have already been proposed for this purpose. Such circuit arrangements usually consist of a delayed pulse generator of the monostable trigger type, possibly with the inclusion of means for varying a bias which controls the delay in accordance with the inter-pulse interval in the pulse train. These known arrangements suffer from the disadvantage that their operation is seriously disturbed if a pulse is omitted from the incoming train.

It is an object of the present invention to provide an advance pulse generator in which certain dificiencies in operation of known arrangements are avoided.

It is a specific object of the invention to provide an advance pulse generator in which the time of recovery to a normal operating condition after the omission of an impulse from a driving impulse train is substantially reduced.

An advance pulse generator according to the invention comprises means for developing a train of initial pulses and for applying these pulses as driving pulses to a pulse driven voltage generator developing a train of sawtooth voltages having stroke portions and intervening flyback portions of which the flyback portions coincide with the driving pulses. These sawtooth voltages are applied by way of a coupling capacitor to first voltage responsive means yielding an output signal when an applied voltage exceeds a first predetermined voltage level and thus generating an advance pulse signal. A second voltage responsive device is fed with the advance pulse signal and responds to the level of this signal exceeding a second predetermined voltage level by developing an output current which is applied to said coupling capacitor so as to reduce the charge thereon and thus to reduce the period of malfunction of the advance pulse generator which results from the omission of an initial pulse.

The features of the invention which are believed to be novel are recited with particularity in the appended claims. The invention, together with further features and advantages thereof, is best understood from the following description taken in conjunction with the accompanying drawings, in the several figures of which like elements are denoted by like reference numerals and in which:

FIGURE 1 is a partially schematic circuit diagram of one embodiment of the advance pulse generator in accordance with the present invention, FIGURE 2 comprises three waveform diagrams illustrating currents and a voltage appearing in the arrangement described in relation to FIGURE 1, FIGURE 3 is a circuit diagram illustrating one embodiment of advance pulse generator according to the present invention, and FIGURE 4 is a series of waveform diagrams illustrating the operation of the advance pulse generator described with reference to FIGURE 1.

In the arrangement illustrated in FIGURE 1 a capacitor 1, having a capacitance $C_1$ is continuously charged at a substantially constant rate by way of the collector emitter path of a transistor 2 and by way of a resistor 3 from a direct voltage source represented only by terminals + and —. Capacitor 1 is periodically discharged by way of a switch 4, which in practice will usually be an electronic switch such as a transistor. There is thus generated across capacitor 1 a periodic voltage of sawtooth waveform such as is illustrated by waveform B in FIGURE 2. The sawtooth voltage wave 2B thus developed is applied by way of a capacitor 5 to the base of a transmitter 6 which is a p-n-p transistor having its emitter connected directly to the positive supply line and its collector returned to the negative supply line by way of a resistor 7. The direct bias voltage applied to the base of transistor 6 by way of a resistor 8 and the value of the negative-going sawtooth voltage developed across capacitor 1 determines the point in the cycle at which transistor 6 will conduct, and thus yield a positive-going pulse at an output terminal 9 connected to its collector.

The circuit arrangement as thus far described is of a type already known for the purpose of generating pulses having leading edges delayed with respect to those of an initiating pulse train. It suffers from the serious disadvantage that should an impulse be omitted from the train of driving impulses the sawtooth voltage developed across capacitor 1 will continue to rise and a large change in charge will result on capacitor 5. When this occurs, the circuit arrangement requires a considerable time to recover to its normal working condition after the drive pulse train has been restored, particularly if the advance is only a very small fraction of the period.

In accordance with this embodiment of the present invention there is provided an additional n-p-n transistor 10, of which the base is connected to the collector of transistor 6 by way of a capacitor 11 and is returned to the positive supply line by way of a resistor 12. The emitter of transistor 10 is connected to the negative supply line and its collector is returned through a resistor 13 to the base of transistor 6. The component values associated with the base of transistor 10 are so chosen that under normal conditions the circuit acts as a peak rectifier and transistor 10 conducts only for the same period as transistor 6. However, if the period of the signal at the collector of transistor 6 much exceeds that corresponding to a normal interval between pulses in the driving pulse chain transistor 10 conducts continuously. When transistor 9 conducts it restores the charge on capacitor 3 to a value nearer its normal level and thus greatly reduces the recovery time of the circuit arrangement.

The principle upon which the circuit operates may be explained as follows, with reference to FIGURE 2, in which the curves 2A, 2B and 2C, respectively, represent the current through transistor 2, the voltage across capacitor 10 and the current through a resistor 8. During the major portion of the working stroke of the circuit transistors 6 and 10 are cut off and a current, which is the sum of the current $I_2$ flowing through transistor 2 and the current $I_8$ flowing through resistor 8 charges capacitor 1. When transistor 6 passes current at time $T_p-T_a$ the junction of capacitor 5 and resistor 8 is effectively connected to the positive line. The current $I_8$ through resistor 8 now flows to the base of transistor 6, and the current $I_2$ through transistor 2 is divided between capacitors 1 and 5 in proportion to their capacitances. The current in capacitor 1 now becomes $I_2 \times C_1/(C_1+C_5)$ while that through capacitor 5 becomes $I_2 \times C_5/(C_1+C_5)$.

Since the changes of charge in $C_5$ in the two modes of operation of the circuit must be equal for cyclic operation we have:

$$I_8(T_p-T_a)=I_2\frac{C_5}{(C_1+C_5)}\cdot T_a$$

whence $$T_a=(T_p-T_a)\frac{I_8}{I_2}\cdot\frac{(C_1+C_5)}{C_5}$$

and the mark: space ratio R of the advance pulse generated is given by:

$$R=\frac{T_a}{(T_p-T_a)}=\frac{I_8}{I_2}\cdot\frac{(C_1+C_5)}{C_5}$$

The invention will now be more fully described with reference to the practical circuit diagram shown in FIGURE 3 and the waveform diagrams of FIGURE 4.

In FIGURE 3, positive-going drive impulses received at terminal 21 are fed through a diode 22 and a resistor 23 to the base of an n-p-n transistor 24 which is thus rendered conductive.

The base of transistor 24 is directly connected to the collector of a further transistor 25 and the collector of transistor 24 is connected by way of a capacitor 26 to the base of transistor 25. The monostable trigger circuit thus formed and indicated generally at M.T. within broken lines, yields across the collector load resistor 28 of transistor 24 a negative-going pulse of predetermined duration determined by the time-constant formed by coupling capacitor 26 and a resistor 29 through which the base of transistor 25 is returned to the earthed positive line. This negative-going pulse is fed by way of a capacitor 30 and a resistor 31 to the base of a p-n-p transistor 32, this base being returned to the negative line by way of a resistor 33 while its emitter is returned to the positive line through a resistor 34 so that transistor 32 conducts during the negative-going pulse but is cut off for the remainder of the period thus discharging a capacitor 35 connected from its collector to the positive line.

Capacitor 35 is charged from the negative line by way of a constant-current device formed by an n-p-n transistor 36 having its emitter connected to the negative line by way of a resistor 37, its base held at an appropriate potential by voltage-divider resistors 38, 39 connected from the base to the negative and positive lines respectively and its collector connected to capacitor 35.

There is thus developed across capacitor 35 a negative-going sawtooth voltage which is fed by way of a capacitor 40 to the base of a p-n-p transistor 41. This transistor has its base returned to the negative line, or to a suitable source of variable negative bias if a variable advance is required, through a resistor 42 and its collector returned to the negative line by way of a resistor 43 and to the positive line by way of a resistor 44. The emitter of transistor 41 is returned to the negative line by way of a resistor 45 and to the positive line by way of the parallel combination of a resistor 46 and a capacitor 47. The time constant of components 45, 46 and 47 is chosen to be very long compared with the repetition rate and transistor 41 passes current only when the negative-going sawtooth voltage applied to its base by way of a capacitor 40 takes the base more negative than the emitter. When this occurs a positive-going impulse appears across resistor 43 whence it is applied to the base of a p-n-p transistor 48 which is coupled to a further p-n-p transistor 49 to form a bistable trigger circuit the construction and operation of which is so well known as not to require further description, and which yields at an output terminal 50 a pulse of predetermined duration at an interval after the initiating pulse which when the apparatus is operating normally is accurately determined by the circuit constants.

The circuit arrangement as thus far described is known and it suffers from a disadvantage which will now be further explained with reference to the waveform diagrams of FIGURE 4. Each initiating pulse in the negative-going pulse train shown in FIGURE 4A causes the production at the collector of transistor 32 of one cycle of the sawtooth voltage illustrated by FIGURE 4B. If, however, an initiating pulse, for example that shown in broken line at 51 in FIGURE 4A, is omitted, then the sawtooth voltage will continue to fall below its normal minimum as shown at 52 in FIGURE 4B, until transistor 36 bottoms and prevents any further fall in voltage. The excess charge thus introduced into capacitor 35 is removed by the next succeeding pulse 53 of the train of initial pulses, after which the production of the sawtooth voltage continues normally.

The operation of transistor 41, however, is greatly disturbed. In normal operation this transistor passes a brief pulse of current which takes its collector positive, as illustrated by waveform 4D, only when the negative excursion of its base exceeds its emitter potential, indicated by broken line 54 in waveform 4C. Each time this occurs there is introduced into capacitor 40 a small increment of charge, which then leaks away again during the remainder of the cycle, so that there arises at the base of transistor 41 the voltage waveform shown by FIGURE 4D. Since in many practical applications the advance pulses of waveform 4C are required to occur only very shortly before the end of a cyclic period, the normal variation in charge on capacitor 40 is very small. When an impulse is omitted from the driving train, however, the sawtooth waveform which would normally arise at the base of transistor 41 during the succeeding cycle is omitted, the voltage at this point remaining at its most negative value during the whole cycle as shown at 54 in waveform 4C. During this cycle, therefore, transistor 41 will remain conductive, as shown at 55 in waveform 4D. The initial, almost horizontal portion of waveform 55 occurs because transistor 41 is initially driven hard on by current through capacitor 40, due to the potential at the collector of transistor 32 continuing to go negative beyond its normal value as shown at 52 in waveform 4B. When transistor 36 bottoms, however, thus stabilizing the potential at the collector of transistor 32, transistor 41 will slowly be cut off as indicated by the curved portion of waveform 55.

The larger than normal positive-going change in voltage occurring at the collector of transistor 32 (shown at 56 in waveform 4B) when the drive pulse subsequent to the omitted pulse occurs causes a correspondingly large positive-going change in the voltage at the base of transistor 41. This change occurs from the normal most negative level of the signal, so that in several of the immediately succeeding cyclic periods the negative-going peaks of the sawtooth voltage at the base of transistor 41 will not go sufficiently negative to cause the transistor to conduct, so that a dwell occurs in the signal appearing at the collector of transistor 41, as shown at 57 in waveform 4D. Only when the excess charge has leaked away again to such an extent that the negative-going peaks of waveform 4C again exceed the emitter potential of transistor 41, indicated by broken line 54 in waveform 4C, does this transistor again conduct to give rise to positive-going pulses at its collector.

When the present invention is not used, the large excess of charge thus built up on capacitor 40 takes a considerable time to leak away through resistor 42. This time increases as the mark:space ratio of the advance pulses decreases, so that for small percentage advances the excess charge may persist for a hundred or more cycles.

To avoid this difficulty a circuit arrangement according to the invention, indicated generally at A.S. within broken lines, contains a further n-p-n transistor 61 of which the base is returned to the positive line through a resistor 62 and is fed by way of a capacitor 63 with the signals appearing at the collector of transistor 41. During the normal operation of the circuit these signals have the form shown by the first two cycles of waveform 4E. Under these conditions transistor 61 will pass current only during the periods when the tips of the voltage pulses applied to its base exceed the turn-on voltage of the transistor which is represented by broken line 58 in waveform 4E. The voltage appearing at the collector of transistor 61 is illustrated by waveform 4F. During the cycles immediately following that in which a pulse is omitted from the drive train, however, the signal applied to the base of transistor 61 exceeds level 58 for a considerable period, thus causing transistor 61 to become continuously conductive, as shown at 59 in waveform 4E. The current passed by transistor 61 is drawn by way of resistor 64 from capacitor 40, so that the charge on this capacitor is rapidly restored to its correct operating level. The period during which the operation of the advance pulse generator circuit is disabled by an elided drive pulse may thus be reduced from many cycles to a few cycles only of the circuit operation.

While particular embodiments of the invention have been shown and described, it is apparent that changes and modifications may be made without departing from the invention in its broader aspects. The aim of the appended claims, therefore, is to cover all such changes and modifications as fall within the true spirit and scope of the invention.

We claim:

1. An advance pulse generator comprising:

(a) a driving pulse generator for producing a train of driving pulses;

(b) a sawtooth generator connected to the driving pulse generator and arranged to produce a driven train of sawtooth pulses in response to the driving pulses with the tail of each sawtooth pulse substantially time coincident with the corresponding driving pulse;

(c) a coupling capacitor connected to the sawtooth generator and arranged to apply these sawtooth pulses to (d) first voltage responsive means having an input connected to receive the sawtooth pulses from the coupling capacitor and to produce an output only when the voltage at the input exceeds a first predetermined level;

(e) second voltage responsive means having an input connected to receive a voltage representative of that voltage appearing across the coupling capacitor and arranged to provide a discharge path for the coupling capacitor when the input to the second voltage responsive means and thereby the voltage across the coupling capacitor exceeds a second predetermined voltage produced by the omission of a driving pulse from the driving pulse train, so as to reduce the period of malfunction of the advance pulse generator as a result of such pulse omission.

2. An advance pulse generator according to claim 1, wherein the input of the second voltage responsive means is connected to an output of the first voltage responsive means.

3. An advance pulse generator according to claim 1 in which said pulse driven voltage generator means comprises, in combination; a timing capacitor; constant current means connected to charge said capacitor; transistor switch means connected to discharge said capacitor; and means for applying said initial pulses to cause said transistor switch means to become conductive.

4. An advance pulse generator according to claim 1 in which said pulse driven voltage generator means comprises an input terminal; means for applying said initial pulses to said input terminal; first and second n-p-n transistors each having base, emitter and collector electrodes; a source of direct potential having positive and negative terminals; a direct connection from said emitter electrode of each said n-p-n transistor to said negative terminal of said source; individual resistors connecting said collector electrodes of said n-p-n transistors to the positive terminal of said source; a direct connection from said collector electrode of said first n-p-n transistor to said base electrode of said second n-p-n transistor; a capacitor connecting said collector electrode of said second n-p-n transistor to said base electrode of said first n-p-n transistor; a resistor connecting said input terminal to said base electrode of said second n-p-n transistor; a timing capacitor; a third n-p-n transistor having base, emitter and collector electrodes; a resistor connecting said emitter electrode of said third n-p-n transistor to said negative terminal of said source; individual resistors connecting said base electrode of said third n-p-n transistor to said negative and positive terminals respectively of said source; a direct connection from said collector electrode of said third n-p-n transistor to a terminal of said timing capacitor; a direct connection from the other terminal of said timing capacitor to said positive terminal of said source; a p-n-p transistor having base, emitter and collector electrodes; a resistor connecting said base electrode of said p-n-p transistor to said negative terminal of said source; a coupling circuit including a capacitor between said base electrode of said p-n-p transistor and said collector electrode of said second n-p-n transistor; a direct connection from said collector electrode of said p-n-p transistor to said one terminal of said timing capacitor; and a resistor connecting said emitter electrode of said p-n-p transistor to said positive terminal of said source.

5. An advance pulse generator according to claim 1 in which said first voltage responsive means comprises, in combination: an input terminal; a transistor having emitter, collector and base electrodes; a capacitor connecting said input terminal to said base electrode; a source of direct potential having first and second terminals; a direct connection between said emitter electrode of said transistor and said first terminal of said source; a resistor connecting said base electrode of said transistor to said second terminal of said source; a load resistor connecting said collector electrode of said transistor to said second terminal of said source and means for deriving said advance pulses across said load resistor.

6. An advance pulse generator according to claim 1 in which said first voltage responsive means comprises, in combination: an input terminal a transistor having emitter, collector and base electrodes; a capacitor connecting said input terminal to said base electrode; a source of direct potential having first and second terminals; a direct connection between said emitter electrode of said transistor and said first terminal of said source; a resistor connecting said base electrode of said transistor to said second terminal of said source; a load resistor connecting said collector electrode of said transistor to said second terminal of said source and means for deriving said advance pulses across said load resistor and in which said second voltage-responsive means comprises, in combination a further transistor of the conductivity type opposite to that of first said transistor and having emitter, collector and base electrodes; a capacitor connecting said collector electrode of first said transistor to the base electrode of said further transistor; a resistor connecting said base electrode of said further transistor to said second terminal of said source; a direct connection from the emitter of said further transistor and said second terminal of said source; and a resistor connecting the collector electrode of said further resistor to the junction of the base electrode of first said transistor with said coupling capacitor.

References Cited by the Examiner

UNITED STATES PATENTS

| | | | |
|---|---|---|---|
| 3,124,706 | 3/1964 | Alexander | 307—88.5 |
| 3,229,151 | 1/1966 | Attwood | 307—88.5 |

ARTHUR GAUSS, *Primary Examiner.*

J. HEYMAN, *Assistant Examiner.*